United States Patent Office 3,169,961
Patented Feb. 16, 1965

3,169,961
VANADIUM COMPLEX SALTS WITH HYDRAZINO PYRIDAZINES AND PHTHALAZINES
Adrian Marxer, Muttenz, Switzerland, assignor to Ciba Corporation, a corporation of Delaware
No Drawing. Filed Jan. 18, 1962, Ser. No. 167,159
Claims priority, application Switzerland, Feb. 3, 1961, 1,314/61; Feb. 14, 1961, 1,704/61
10 Claims. (Cl. 260—242)

The present invention relates to new vanadium-(IV) complexes. More especially it concerns vanadium-(IV) complexes of pyridazine compounds, in which at least one of the two carbon atoms which are adjacent to the nitrogen atoms carries a hydrazino group, such as complexes of the corresponding pyridazines or more especially complexes of 1-hydrazinophthalazines and of 1:4-dihydrazino-phthalazines, in which the proportions of vanadium-(IV) and numbers of hydrazino groups in the pyridazine compound are in the ratio of approximately 1:1.

The new compounds are salts of bases whose pyridazine ring contains once or twice the grouping of the formula

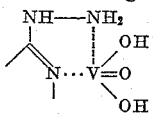

with non-toxic acids, more especially strong inorganic acids such as hydrohalic acids, for example hydrochloric or hydrobromic acid, or nitric, perchloric acid, preferably with sulfuric acid.

Since these bases are poly acid, they may form neutral or basic salts.

The pyridazine nucleus of the new compounds may be substituted; it may contain, for example in position 4 and/or 5 and/or, if desired, in position 6 aliphatic, araliphatic or aromatic hydrocarbon radicals or heterocyclic or heterocyclyl-aliphatic radicals which themselves may likewise be substituted, for example by alkyl radicals, free or substituted amino or hydroxyl groups or by halogen atoms or trifluoromethyl. In the aforementioned positions the new compounds may also contain a fused-on ring which may be substituted by the afore-mentioned radicals. Preferably, they contain a fused-on aromatic ring, for example a benzene or pyridine ring.

Aliphatic, araliphatic or aromatic hydrocarbon radicals or heterocyclic radicals are more especially alkyl groups such as lower alkyl groups, for example methyl, ethyl, propyl, or butyl groups, or aryl or hetero-cyclyl-lower alkyl groups, such as phenyl-lower alkyl, for example, benzyl, β-phenylethyl groups or pyridylmethyl groups or aryl groups such, for example, as phenyl, naphthyl or pyridyl radicals. Substituted amino groups are above all dialkylamino groups such as di-lower alkylamino groups, for example diethylamino, dimethylamino or dipropylamino groups, or acylated amino groups such as lower alkanoylated amino groups, for example acetylamino groups. Substituted hydroxyl groups are above all alkoxy groups such as lower alkoxy groups, for example methoxy, ethoxy, propoxy or butoxy groups, or benzyloxy or phenyloxy groups. Halogen atoms are more especially fluorine, chlorine or bromine atoms.

The new vanadium-(IV) complexes possess valuable pharmacological properties. They have a hypotensive effect and prevent lesions of blood vessels and the deposition of lipoids in the blood vessels. Accordingly, they can be used as medicaments, for example for treating atheromatosis, atherosclerosis or arteriosclerosis, or used for pharmacological experiments on animals. Of special value are the complex salts derived from the base of the formula

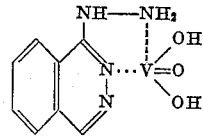

or from the base of the formula

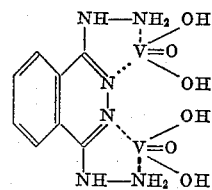

more especially the sulfates.

The new compounds are obtained by reacting a pyridazine compound in which at least one of the two carbon atoms which are adjacent to the nitrogen atoms carries a hydrazino group, with a vanadyl salt. It is of advantage to use the hydrazino pyridazine likewise in the form of a salt thereof. It is of advantage to use for the reaction aproximately as many equivalents of vanadyl salt as hydrazino groups present in the pyridazine compound with one equivalent of the pyridazine compound. The reaction is performed in a solvent, more especially a polar solvent such as an aqueous organic solvent, for example an aqueous lower alkanol, or preferably in water. The method of isolation of the complex salt may differ depending on the solvent or on the starting materials used. When the reaction is carried out in water and the hydrazino-pyridazine is used as a salt, it is of advantage first to neutralize the solution, for example by adding ammonia or a buffer salt, such as sodium acetate, whereupon the complex salt precipitates. In this manner that salt is obtained which is least soluble in the solvent used. In other cases, for example when the reaction is performed in an aqneous organic medium with the use of the hydrazino-pyridazine base, the complex salt precipitates or can be isolated by evaporation.

A resulting salt can be converted by suspension or dissolution in a suitable solvent and addition of a salt of another acid, for example an alkali metal salt, into a salt which is more sparingly soluble in the solvent used.

The new compounds can be used as medicaments in human or veterinary medicine in the form of pharmaceutical preparations containing said compounds in admixture with an organic or inorganic pharmaceutical excipient suitable for enteral or parenteral administration. Suitable excipients are substances that do not react with the products of the invention such, for example, as water, gelatine, lactose, starch, magnesium stearate, talc, vegetable oils, benzyl alcohols, gums, polyalkylene glycols, cholesterol or other known medicinal excipients. The parmaceutical preparations may be, for example, tablets or dragees, or in liquid form, solutions, suspensions or emulsions. They may be sterilized and/or may contain assistants such as preserving, stabilizing, wetting or emulsifying agents or solution promoters. They may also contain other therapeutically valuable substances. The preparations are made by the usual methods. Advantageously they contain 5 to 50 mg., especially 10 to 30 mg. or the active compound per dosage unit, or 1 to 70%, especially 5 to 50% of the active compound.

The starting materials are known or can be manufactured by known methods.

The following examples illustrate the invention.

EXAMPLE 1

A solution of 39.3 grams of 1-hydrazino-phthalazine hydrochloride in 1 liter of water is mixed with a solution of 50.6 grams of vanadyl sulfate ($VOSO_4 \cdot 5H_2O$) in 300 cc. of water. The resulting deep blue solution contains the vanadyl complex of 1-hydrazino-phthalazine. The solution is evaporated to dryness under reduced pressure and the vanadyl complex of 1-hydrazino-phthalazine is isolated.

EXAMPLE 2

A solution of 39.3 grams of 1-hydrazino-phthalazine hydrochloride in 1 liter of water is mixed with a solution of 50.6 grams of vanadyl sulfate ($VOSO_4 \cdot 5H_2O$) in 300 cc. of water. The resulting deep blue solution is treated with 150 cc. of sodium acetate solution of 40% by weight strength and the resulting greenish brown precipitate is suctioned off, thoroughly washed with water and then with alcohol of 95% strength and dried. A brown powder is obtained which according to its analysis is free from chlorine and consists of the vanadyl-sulfate complex of 1-hydrazino-phthalazine.

EXAMPLE 3

A solution of 28.8 grams of 1:4-dihydrazino-phthalazine sulfate in 1200 cc. of water is mixed with a solution of 50.6 grams of vanadyl sulfate ($VOSO_4 \cdot 5H_2O$) in 300 cc. of water. The resulting dark blue solution is treated with 150 cc. of sodium acetate solution of 40% by weight strength and the resulting greenish brown precipitate is suctioned off, washed with water and then with alcohol of 95% strength and dried. The product so obtained is the divanadyl sulfate complex of 1:4-dihydrazino-phthalazine.

EXAMPLE 4

A solution of 28.8 grams of 1:4-dihydrazino-phthalazine sulfate in 1200 cc. of water is mixed with a solution of 50.6 grams of vanadyl sulfate ($VOSO_4 \cdot 5H_2O$) in 300 cc. of water. A dark blue solution of the divanadyl sulfate complex is obtained.

EXAMPLE 5

Tablets containing 25 mg. of the active substance may be prepared, for example, with the following ingredients:

| Ingredients: | Mg. |
|---|---|
| Vanadyl sulfate complex of 1-hydrazino-phthalazine | 25.0 |
| Lactose | 86.0 |
| Potato starch | 75.0 |
| Magnesium stearate | 1.8 |
| Colloidal silicic acid with hydrolysed starch | 4.0 |
| Talc | 8.2 |

Method of preparation

The vanadyl sulfate complex of 1-hydrazino-phthalazine is triturated with the same quantity of lactose to form a homogeneous mixture; the latter is mixed with the remainder of the lactose, which has a suitable grain size (e.g. 100–150μ), and the potato starch, and passed through a screen having a mesh of approximately 0.3 mm. Magnesium stearate, talc and colloidal silicic acid with hydrolysed starch are added, and the mixture is again passed through a sieve having a mesh of the same size and, after being homogeneously mixed again, compressed in the conventional manner to form tablets weighing 200 mg. and of 8 mm. in diameter.

What is claimed is:

1. A complex salt of 3-hydrazino-pyridazine with a vanadyl salt selected from the group consisting of vanadyl sulfate, halide, nitrate and perchlorate.

2. A complex salt of pyrido[d]-pyridazine, which contains at the carbon atom in one ortho-position of one nitrogen atom in the pyridazine nucleus the hydrazino-group with a vanadyl salt selected from the group consisting of vanadyl sulfate, halide, nitrate and perchlorate.

3. A complex salt of 1-hydrazino-phthalazine with a vanadyl salt selected from the group consisting of vanadyl sulfate, halide, nitrate and perchlorate.

4. A vanadyl sulfate complex of 1-hydrazino-phthalazine.

5. A vanadyl sulfate complex of 1-hydrazino-phthalazine, wherein the proportion of vanadium-(IV) to phthalazine-compound are in the ratio of approximately 1:1.

6. A complex salt of 3,6-dihydrazino-pyridazine with a vanadyl salt selected from the group consisting of vandyl sulfate, halide, nitrate and perchlorate.

7. A complex salt of 1,4-dihydrazino-phthalazine with a vanadyl salt seletced from the group consisting of vanadyl sulfate, halide, nitrate and perchlorate.

8. A complex salt of pyrido[d]-pyridazine, which contains hydrazino groups at both of the carbon atoms in the ortho-position to the nitrogen atoms in the pyridazine nucleus with a vanadyl salt selected from the group consisting of vanadyl sulfate, halide, nitrate and perchlorate.

9. A vanadyl sulfate complex of 1,4-dihydrazino-phthalazine.

10. A vanadyl sulfate complex of 1,4-dihydrazino-phthalazine, wherein the proportion of vanadium-(IV) to phthalazine-compound are in the ratio of approximately 2:1.

References Cited in the file of this patent

Jaques et al.: "Arch. Exptl. Path. Pharmakol," vol 230, pages 26–44 (1957).

Ruggieri: "Analytica Chimica Acta," vol. 16, pages 246–8 (1957).

Kirpekar et al.: "J. Pharm. and Pharmacol.," suppl. 203T–209T (1959).